Patented June 5, 1928.

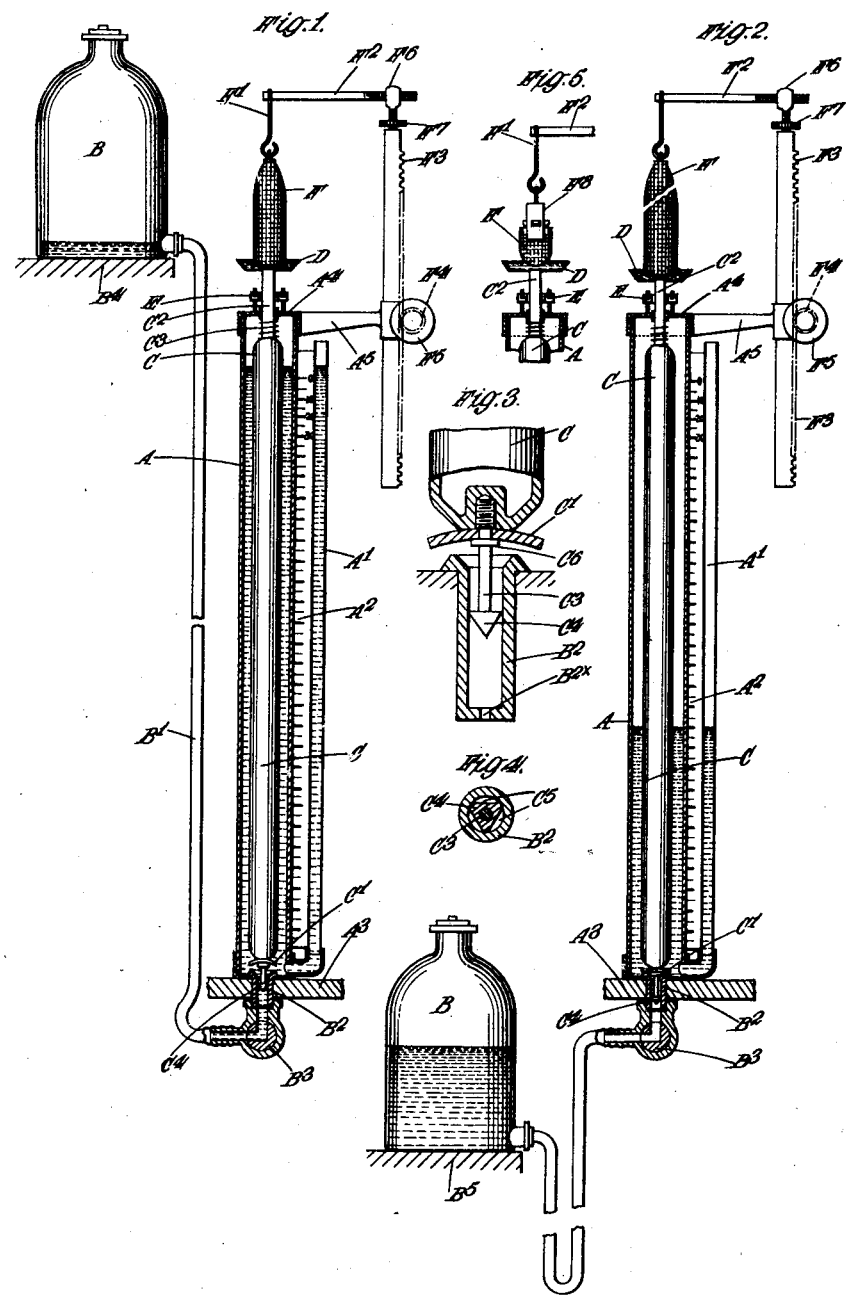

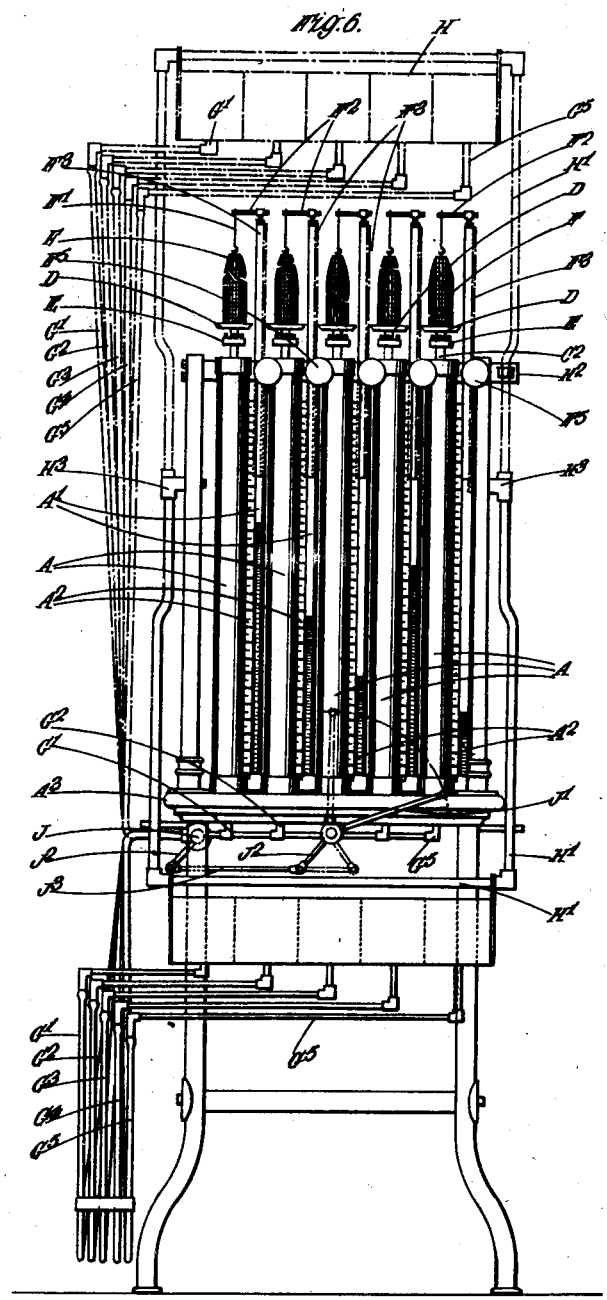

1,672,077

UNITED STATES PATENT OFFICE.

JOSEPH THEODORE ROBIN, OF STREATHAM, ENGLAND.

METHOD AND APPARATUS FOR TESTING FRAGILE ARTICLES.

Application filed November 2, 1921, Serial No. 512,324, and in Great Britain November 4, 1920.

This invention relates primarily but not exclusively to the testing of gas mantles, the chief object being to determine accurately and expeditiously, the tensile strength of such articles.

According to this invention, the upper end of the mantle to be tested may be supported or held by its usual suspending means such as the loop of an upright mantle or the supporting ring of an inverted mantle, and the circumference of the lower end of the mantle is uniformly held or retained in such manner that by applying an increasing pull or tension, the strain is uniformly distributed or transmitted over the whole mantle structure, so that its tensile strength may be accurately tested. One of the main features of the present invention consists in the method of and means for holding or retaining the lower end of the mantle without injuring this part of the mantle, and for this purpose I may use a substance capable of changing from liquid form to solid form so that the substance in changing from liquid to solid form becomes united or sealed to the lower end of the mantle thereby affording a connection which enables the pull or tension to be exerted on the mantle. The substance which I have found to give most satisfactory results is wax, and in order that it may be united or sealed to the mantle, it is first melted whereupon the lower end of the mantle is immersed in the melted wax (which is contained in a pan or tray) so that when the wax is allowed to harden it becomes sealed or united to the lower end of the mantle thereby affording the connection which enables the necessary pull or tension to be exerted on the mantle. In one example of means for exerting the pull or tension on the mantle, the wax pan may be carried by a buoyant member or float vertically movable in a vessel or cylinder containing liquid and by changing the relative positions of the liquid level and the float, for example, by allowing the liquid to escape from the cylinder, the float remains supported by the mantle through the connection afforded by the wax and the pan and owing to the gradual escape of the liquid the weight supported by the mantle increases from zero until the pull exerted on the mantle by the increasing weight causes breakage, whereupon the float drops and traps the liquid remaining in the cylinder, for instance, by means of a valve on the lower end of the float closing the outlet in the cylinder. The weight of that portion of the float not immersed in the liquid is the weight which the mantle supported up to its breaking point and the level of the trapped liquid indicates by means of an adjacent scale this weight which represents the tensile strength of the mantle. With the object of testing several mantles simultaneously a number of testing units such as set forth above may be embodied in one apparatus but such units operate independently thus enabling the different tensile strengths of the several mantles to be determined. The method of obtaining a connection by means of a substance which is capable of changing from liquid to solid form is applicable to the testing of other articles or materials of a fragile character, whilst the apparatus in conjunction with this method of securing the article, or not, may be used for testing the tensile strengths of other kinds of articles or materials.

In order that the said invention may be clearly understood and readily carried into effect, the same will now be described more fully with reference to the accompanying drawings, in which:—

Figures 1 and 2 are diagrams showing one construction of the apparatus for testing the tensile strength of gas mantles and illustrating respectively the position of the parts before and after testing the mantle.

Figures 3 and 4 are enlarged detail views hereinafter referred to.

Figure 5 is a fragmentary view showing an adapter or support for enabling an inverted mantle to be tested.

Figure 6 is a diagrammatic front elevation showing several testing units combined into one apparatus.

A is a metal liquid-container or cylinder in communication at its lower end with a glass sight tube A' with which is associated a scale bar $A^2$, the whole being suitably supported on a table $A^3$. B is a liquid supply vessel connected by a flexible pipe B' to a tube $B^2$ opening into the lower end of the cylinder A; communication between the cylinder A and the vessel B through the pipe B' and the tube $B^2$ is controlled by a two-way cock $B^3$. C is the float vertically movable in the cylinder A and provided at its lower end with a valve C' and at its upper end with an extension $C^2$ passing freely through a cap $A^4$ on the upper end of the cylinder. D is the pan which contains the wax used to grip or hold the lower end or part of the mantle and which is carried by the extension $C^2$ on the float. Supported on the cap $A^4$ below the pan D is a small gas or spirit burner E for melting the wax in the pan D. As shown in Figure 1 an upright mantle F is suspended by its ordinary loop on a hook F' adapted to be readily hung on the end of an arm $F^2$ adjustably supported on the upper end of a rack rod $F^3$ slidably mounted in a frame or bracket $A^5$ which may form part of the cap $A^4$ and adapted to be raised or lowered by means of a pinion $F^4$ meshing with the rack $F^3$. The shaft of the pinion has a milled knob $F^5$ for rotating the pinion and vertically moving the rack $F^3$ according as to whether the mantle supporting arm $F^2$ is to be raised or lowered; the supporting arm $F^2$ may be threaded into a socket $F^6$ so as to be adjustable lengthwise, the socket being also threaded into the upper end of the rack rod $F^3$ and provided with a lock nut $F^7$.

Initially the supply vessel B is supported above the upper end of the cylinder A, for example, on a shelf $B^4$ so that liquid flows through the pipe B', the tube $B^2$ and the passage in the cock $B^3$ into the cylinder A until the latter is filled with liquid or nearly so at which time the float is balanced in the liquid. After the liquid has been supplied to the cylinder the cock $B^3$ is adjusted to shut off communication between the cylinder A and the vessel B. A light spring $C^3$ is provided at the upper end of the float to serve as a resilient stop or buffer by coming into contact with the cap $A^4$ if the float should be forced upwardly as a result of supplying too much liquid to the cylinder, thus ensuring that the valve or washer C' at the lower end of the float is maintained at the required short distance from the seating on the tube $B^2$. The scale bar $A^2$ may be vertically adjustable in any suitable manner to enable its zero mark to be initially set to the required position taking into consideration the slight amount of liquid that will be upwardly displaced by the float dropping to close the outlet tube $B^2$ as hereinafter described. When the proper position for the zero mark has been determined the liquid in being supplied to the cylinder is allowed to flow in until the level is above the zero mark as shown in Figure 1. After the collodion on the mantle has been burnt, the wax in the pan D is melted to a liquid state by the flame from the burner E whereupon the flame is extinguished and the mantle lowered by the aforesaid rack and pinion gearing, until the lower end of the mantle is immersed in the liquid wax without however touching the bottom of the pan. The wax is then allowed to cool and harden thereby becoming united or sealed to the mantle and affording by reason of its adherence to the pan D a connection between the mantle and the float, for enabling the pull or tension to be exerted uniformly on the mantle to test its tensile strength; for this purpose the vessel B is placed below the lower end of the cylinder on a shelf $B^5$ and the cock $B^3$ is then opened so that the liquid flows from the cylinder A and the sight tube A' into the vessel B. As the liquid leaves the cylinder the float is no longer balanced by the liquid but remains supported in its original position by the mantle itself through the connection afforded by the wax so that as the water flows from the cylinder the weight supported by the mantle (which of course is non-elastic) increases from zero until it breaks the mantle. Upon breakage of the mantle taking place the float immediately drops and closes the outlet of the cylinder by its valve C' contacting with the seating on the tube $B^2$ thereby trapping the remaining liquid in the cylinder A and the sight tube A' so that the liquid level indicates by means of the scale $A^2$ (preferably marked to indicate grammes) the maximum weight which the mantle has supported up to its breaking point and therefore the tensile strength of the mantle. The scale $A^2$ is graduated according to the shape of the float which is used and in the example shown the float is of uniform shape longitudinally so that the scale may be uniformly graduated with equally spaced divisions each representing for example one gramme. In setting the apparatus ready for another test the vessel B is raised on to the shelf $B^4$ to fill the cylinder and sight tube after the cock $B^3$ has been adjusted and the cycle of operations above set forth is again carried out. When the wax is melted again the broken piece of the mantle immersed therein can be readily removed.

It is important to use a wax which will not contract appreciably in hardening to ensure adherence to the pan and which will cool rapidly to prevent the melted wax from seeping up the mantle structure to any substantial extent. I have found that a combination of waxes such as ozokerite and a small proportion of carnauba wax is satisfactory as this cools so rapidly that immediately a portion of the wax commences to seep up the mantle, this portion of the wax being in the nature of a film readily cools and thus automatically prevents further seeping of the wax up the mantle structure. It is also important that the float should have free movements in a vertical direction whilst being restrained against undue lateral movement which would detrimentally affect the mantle being tested. Therefore the lower end of the float has threaded therein a stem C³ˣ formed with a guiding piece C⁴ which projects into and fits closely in the outlet tube B² which in conjunction with the extension C² passing freely through the cap A⁴ prevents undue lateral movement of the float and the wax pan carried thereby. The said guiding piece C⁴ is formed with flattened surfaces as shown in Figure 4 forming passages C⁵ between the guiding piece and the tube B² for the liquid when flowing into or out of the cylinder. The tube B² is provided with a restricted outlet opening B²ˣ the area of which is less than the combined area of the passages C⁵, the object of this restricted passage being to retard the flow of the liquid so as to avoid the likelihood of the liquid being sucked passed the valve C after it makes contact with its seating on the tube B². As shown in Figure 3 the stem C³ is formed with a collar C⁶ which clamps the rubber valve or washer C' against a concave surface at the lower end of the float so that the said valve or washer is retained in a curved or dished condition for enabling it to make an effective liquid-tight joint when resting on the seating formed at the upper end of the outlet tube B². It is not in all cases necessary to test mantles to breaking point as a certain standard tensile strength may be determined and if the mantle reaches this standard without breaking, the flow of the liquid may be stopped by means of the cock B³ so that after melting the wax the mantle may be removed.

In testing an inverted gas mantle the ordinary supporting ring of the mantle is placed on lugs formed on an adapter F, see Figure 5, which is suspended on the hook F' from the supporting arm F³ and the lower end of the mantle is immersed in the wax and the other operations hereinbefore described are carried out to test the tensile strength of the inverted mantle.

In the construction shown in Figure 6 five cylinders A with sight tubes A' such as shown in Figure 1 are mounted on a table A³; the various parts associated with each cylinder are similar to those described in connection with Figure 1 and corresponding reference letters are used to denote the similar parts. In this example however the several cylinders are connected by independent pipes G', G², G³, G⁴, G⁵, to five separate compartments in a common liquid supply tank H. The independent pipes are controlled by independent two-way cocks mounted so that they can be operated simultaneously by a lever J' through crank arms J² and connecting links J³. The tank H is carried by a swinging frame H' capable of being placed in a raised position and retained therein by a safety catch H² to fill the cylinders and sight tubes when the two-way cocks are adjusted for this purpose by the lever J'; after filling the cylinders the cocks are operated by oppositely moving the lever J' to shut off communication between the cylinders and their respective compartments in the tank H. By releasing the safety catch H² the frame H can be swung on its pivots H³ and lowered to rest against suitable stops so that the tank is retained below the lower ends of the cylinders thus enabling the liquid to flow out of the various cylinders into the respective compartments of the tank by opening the two-way cocks in order that the mantles can be simultaneously subjected to independent testing operations as hereinbefore described. The mantles break according to their respective tensile strengths and as each mantle breaks, the float released thereby, drops and traps the liquid in the corresponding cylinder without interfering with the liquid in the other cylinders so that after all the mantles have been broken, the different liquid levels in the sight tube serve to show the different maximum weights supported by the mantles and therefore the respective tensile strengths of the mantle; this position of the apparatus is shown in Figure 4.

As hereinbefore stated the testing apparatus may be used for testing various articles or materials which may be gripped or held by means of the wax or by other means.

What I claim and desire to secure by Letters Patent of the United States, is:—

1. The method of testing the tensile strength of a fragile article, which consists in placing one end of the article in contact with a liquid substance, allowing the liquid substance to solidify and become united to said end, connecting the article to a relatively stationary member at a point remote from said end, and applying a pull to the article exerted through the support at one end and the substance at the other end.

2. A method of testing the tensile strength of gas mantles or other fragile articles, which consists in placing the lower end of the mantle in a liquid substance that can change to solid form, allowing the liquid substance to solidify and become united to the mantle, attaching the other end of the mantle to a suitable support, and applying a pull to the mantle exerted through the support at one end and the substance at the other end.

3. The method of testing the tensile strength of gas mantles, which consists in placing one end of the mantle in contact with melted wax, allowing the wax to solidify and become united to said end, connecting the mantle to a relatively stationary member, at a point remote from said end, and applying a pull to the mantle exerted through the support at one end, and the wax at the other end.

4. A method of testing the tensile strength of gas mantles or other fragile articles comprising attaching one end of the mantle to a support, immersing the other end in melted wax, allowing the latter to solidify and become united to the mantle to form a connection, and exerting a gradually increasing pull on the mantle through said connection when held at its ends by the wax and the support.

5. A method of testing the tensile strength of gas mantles or other fragile articles comprising, connecting one end of an article to a support, lowering the said support to immerse the other end of the mantle in melted wax, allowing the wax to solidify and become united to the mantle to form a connection to a device whose weight is initially supported independently of the mantle and gradually removing the support so as to exert an increasing pull on the mantle through the aforesaid wax connection.

6. Apparatus for testing the tensile strength of fragile articles, comprising a support adapted to be engaged by one end of the article, a movable member, a tenacious waxy substance connecting the other end of the article to said movable member, liquid means for normally supporting said movable member, and means whereby the liquid level may be lowered so that the movable member will exert a pull on the mantle.

7. Apparatus for testing the tensile strength of gas mantles or other fragile articles comprising a support adapted to be engaged by one end of the mantle, a movable weight applying device, a tenacious substance for connecting the other end of the mantle to the said device, said mantle when connected to said device being arranged to act partially as a support therefor, and means whereby the weight of the said device when the mantle is acting as a support for the same will exert a gradual increasing pull on the mantle.

8. Apparatus for testing the tensile strength of gas mantles or other fragile articles comprising a supporting member adapted to be connected to the upper end of the mantle, a weight applying device, means for enabling melted wax to solidify on the lower end of the mantle and connect the said device thereto, means for causing the device to exert a gradually increasing pull on the mantle until it breaks, and means operable by said device upon the breaking of the mantle to indicate the maximum weight supported by the mantle and its tensile strength.

9. Apparatus for testing the tensile strength of gas mantles or other fragile articles, comprising a supporting member adapted to be connected to the upper end of the mantle, a liquid container, a float immersed in liquid in the container, means for enabling melted wax to solidify in the lower end of the mantle and connect the float thereto, and means for changing the relative position of the liquid level and the float so that the float is not balanced in the liquid but remains supported by the mantle, and exerts an increasing pull on the mantle as the position of the liquid level changes relative to the float.

10. Apparatus for testing the tensile strength of gas mantles or other fragile articles, comprising a support, means connecting the upper end of the mantle to said support, a liquid container having liquid in said container, a valve opening in the bottom thereof, a float normally balanced in the liquid in the container, a normally open valve operated by said float for closing said opening, means connecting the mantle to the float, means controlling the supply of liquid to and from the container so that upon withdrawal of the liquid the float will be partially supported by the mantle, until the increasing weight of the float supported by the mantle breaks the latter and causes the valve to close the said opening, and means indicating the maximum weight supported by the mantle.

11. Apparatus for testing the tensile strength of gas mantles or other fragile articles comprising a support, means connecting the upper end of the mantle to said support, a liquid container having an opening in the bottom thereof, liquid in said container, a float normally balanced in said container so as to be maintained a short distance above said opening, said float adapted when lowered to close said opening, means for connecting the mantle to the upper part of the balanced float, and means whereby the liquid can be allowed to flow out of the container for enabling the float to be gradually supported by the mantle as the liquid escapes through the said opening until the increasing weight of the float supported by the mantle breaks the latter, whereupon the float drops and closes the said opening so as to trap the remaining liquid in the container, the level of the trapped liquid indicating the maximum weight supported by and the tensile strength of the mantle.

12. Apparatus for testing the tensile strength of gas mantles or other fragile articles comprising a support, means connecting the mantle to said support, a liquid container having an outlet in the bottom thereof, liquid in said container, a normally open valve for closing said outlet, a float balanced in said container above said outlet, said float adapted when lowered to actuate the valve so as to close said outlet, means connecting the mantle to the float, and means controlling the supply of liquid to and from the container through the outlet to enable the float to be gradually supported by the mantle as the liquid passes through the outlet until the weight of the float supported by the mantle breaks the latter, so that the float causes the valve to close the outlet and trap the remaining liquid in the container, the level of the trapped liquid indicating the maximum weight supported by the tensile strength of the mantle.

13. Apparatus for testing the tensile strength of gas mantles or other fragile articles comprising an adjustable support, means connecting the mantle to said support, a liquid container having an outlet in the bottom thereof, liquid in said container, a normally open valve for closing said outlet, a float balanced in said container above said outlet, means connecting the mantle to said float, comprising a substance capable of readily changing from liquid to solid form, said float when lowered adapted to actuate said valve so as to close the outlet, means for adjusting the support vertically relative to the container, and means controlling the supply of liquid to and from the container through said outlet to enable the weight of the float to be gradually applied to the mantle until the latter breaks, whereupon the float drops and causes the valve to close the outlet, thereby trapping the remaining liquid in the container, the level of the trapped liquid indicating the maximum weight supported by the article.

14. Apparatus for testing the tensile strength of gas mantles or other fragile articles comprising a support, means connecting the mantle to said support, a liquid container having an outlet in the bottom thereof, liquid in said container, a normally open valve for closing said outlet, a float balanced in said container above said outlet, means connecting the mantle to the float, comprising a substance capable of readily changing from liquid to solid form, said float adapted when lowered to actuate the valve so as to close the outlet, a vertical scale adjacent the liquid container, and means controlling the supply of liquid to and from the container to enable the weight of the float to be gradually applied to the mantle until the latter breaks, whereupon the float drops and causes the valve to close the outlet, thereby trapping the remaining liquid in the container, the level of the trapped liquid indicating the maximum weight supported by the mantle.

15. An apparatus for testing the tensile strength of gas mantles or other fragile articles comprising a series of liquid containers each having an outlet opening, a normally open valve for closing each of said openings, a common liquid supply tank divided into separate compartments, independent pipes connecting the several compartments of the tank to the several containers, each of said containers having a float balanced therein, the floats adapted when lowered to actuate the valves so as to close the openings, means connecting the lower end of each mantle to its adjacent float, which means comprises a substance capable of readily changing from liquid to solid form, and means controlling the supply of liquid to and from the container to enable the float to be gradually supported by the mantle as the liquid passes through the outlet until the weight of the float supported by the mantle breaks the latter so that the float drops and causes the valve to close said outlet, thus trapping the remaining liquid in the container, the level of the trapped liquid indicating the maximum weight supported by the mantles.

16. Apparatus for testing the tensile strength of gas mantles or other fragile articles, comprising a pan for containing wax, means whereby the lower end of the mantle may be immersed in the wax when melted, which upon solidifying, connects the mantle to said pan, a support for the opposite end of the mantle, and means whereby the mantle when held by the wax can be subjected to an increasing pull.

17. Apparatus for testing the tensile strength of gas mantles or other fragile articles comprising a liquid container, a float normally balanced in the liquid in said container, supporting means for the upper end of the mantle, a pan supported by said float containing wax which can be solidified onto the lower end of the mantle so as to connect the mantle to the upper end of the float while balanced in the liquid, and means for allowing the liquid to flow out of the container to enable the weight of the float to be gradually supported by the mantle in order to test its tensile strength.

18. Apparatus for testing the tensile strength of gas mantles or other fragile articles comprising a liquid container having an outlet in the bottom thereof, a float normally balanced in the liquid in said container, supporting means for the upper end of the mantle, a pan supported by said float and containing wax which may be solidified onto the lower end of the mantle so as to connect the mantle to the upper end of the float while balanced in the liquid, a valve on the lower end of the float adapted to close the liquid outlet in the container when the mantle breaks and allows the float to drop, a guiding member on the lower end of the float fitted in said outlet in such manner as to provide a restricted orifice through which the liquid flows, and means for allowing the liquid to flow out of the container to enable the weight of the float to be gradually supported by the mantle in order to test its tensile strength.

19. Apparatus for testing the tensile strength of gas mantles or other fragile articles comprising a liquid container having an opening in the bottom thereof, a float normally balanced in the liquid in said container, a normally open valve for closing said opening, said float adapted when lowered to actuate the valve to close said opening, a liquid supply vessel communicating with said container, a controlling plug for placing said container in communication with said vessel or for closing the passage from the container to the vessel, a support, means connecting the mantle to the support, a pan carried by said float and containing wax which can be solidified onto the mantle so as to connect the same to the float, said controlling plug allowing the liquid to flow out of the container to enable the weight of the float to be gradually applied to the mantle until the latter breaks, whereupon the float drops and causes the valve to close said opening, the level of the trapped liquid indicating the maximum weight supported by the mantle.

20. Apparatus for testing the tensile strength of gas mantles or other fragile articles comprising a liquid container, a float normally balanced in the liquid in said container, a sight tube connected to the lower end of the container, a vertically adjustable scale bar in close proximity to said sight tube, supporting means for the upper end of the mantle, a pan supported by said float containing wax which can be solidified onto the lower end of the mantle so as to connect the mantle to the upper end of the float while said float is balanced in the liquid, and means for allowing the liquid to flow out of the container to enable the weight of the float to be gradually supported by the mantle in order to test its tensile strength.

21. Apparatus for testing the tensile strength of gas mantles or other fragile articles comprising a liquid container, a float normally balanced in the liquid in said container, a support, a rack vertically movable in said support, a pinion for moving said rack, an adjustable arm carried by the upper end of said rack, a hook on said arm, on which hook the mantle can be suspended, a waxpan carried by the float and containing wax which can be melted so that the mantle can be lowered into the melted wax and united to the waxpan and the float by solidification of the wax, and means for allowing the liquid to flow out of the container to enable the weight of the float to be gradually supported by the mantle in order to test its tensile strength.

22. An apparatus for testing the tensile strength of gas mantles or other fragile articles comprising a liquid container, a float normally balanced in the liquid in said container, a support on which an upright mantle may be suspended by its usual loop, and an adaptor for attachment to said support for enabling an inverted mantle to be attached to and suspended by said support, a waxpan carried by the float and containing wax which can be melted so that the mantle can be lowered into the melted wax and united to the waxpan and the float by solidification of the wax, and means for allowing the liquid to flow out of the container to enable the weight of the float to be gradually supported by the mantle in order to test its tensile strength.

23. An apparatus for testing the tensile strength of gas mantles or other fragile articles comprising a liquid container, a float normally balanced in the liquid in said container comprising a bracket, a rack supported in said bracket, a pinion for vertically moving said rack, an adjustable arm carried by said rack, hook means upon said arm for supporting an upright mantle and an adapter which can be attached to said hook means for enabling an inverted mantle to be supported, a waxpan carried by the float and containing wax which can be melted so that the mantle can be lowered into the melted wax and united to the waxpan and the float by solidification of the wax, and means for allowing the liquid to flow out of the container to enable the weight of the float to be gradually supported by the mantle in order to test its tensile strength.

24. Apparatus for testing the tensile strength of gas mantles or other fragile articles comprising a liquid container, a balanced float therein, a waxpan connected to said float, means for melting wax in said pan, means for supporting the upper end of the mantle so that its lower end can be immersed in the melted wax for eabling the mantle to be connected to the float, guiding means on said float coacting with complementary means in the container for maintaining the float in a central position in the container, and means whereby the liquid can be allowed to flow out of the said container to apply a gradually increasing load to the mantle.

25. Apparatus for testing the tensile strength of gas mantles or other fragile articles comprising a liquid container having an outlet therein, a float therein, a waxpan on the upper end of said float, adjustable supporting means for the upper end of the mantle, means for adjusting the said supporting means for lowering the mantle into melted wax in said pan which wax upon solidification connects the mantle to the float, a valve on the lower end of said float, a guiding member on the lower end of said float for fitting in the outlet a liquid supply vessel adapted to be supported above or below the container, a connecting pipe between said vessel and the container, a controlling plug in said pipe which can be actuated to allow the liquid to flow from the vessel when in its upper position into the container, and to flow from the container into the vessel when in its lower position so that as the liquid flows from the container a gradually increasing load is applied to the mantle until the mantle breaks and allows the float to drop and the valve thereon to close the said outlet, and indicating means whereby the level of the liquid may be readily observed to indicate the weight supported by and the tensile strength of the mantle.

26. Apparatus for testing the tensile strength of gas mantles comprising a plurality of liquid containers, each having an opening in the bottom thereof, each container having a float, each float having a waxpan secured to its upper end and a valve on its lower end for closing the opening in the container, means for independently immersing each of the mantles into the melted wax in said waxpan whereby each of the mantles becomes united to its respective float upon the solidification of the wax, a supporting frame carrying a number of liquid supply vessels, independent pipes connecting said vessels with said containers, each pipe being controlled by a valve, means for operating the said valves simultaneously and means for retaining the said supporting frame for the liquid supply vessels in a position above or below the said containers.

JOSEPH THEODORE ROBIN.